Figure 1:
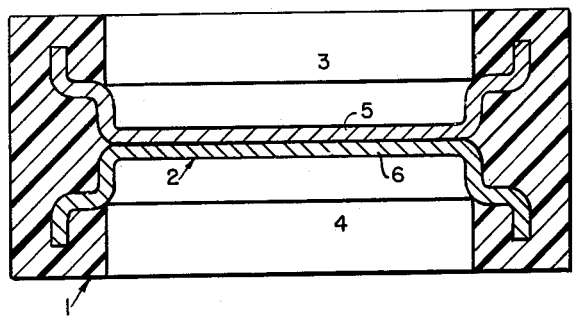

Dec. 2, 1952     A. F. DANIEL     2,620,369

PLASTIC-CASED DRY CELLS

Filed Aug. 2, 1950

*INVENTOR.*
ARTHUR F. DANIEL

BY *Harry M. Saragovitz*
    *Attorney*

Patented Dec. 2, 1952

2,620,369

UNITED STATES PATENT OFFICE 2,620,369

PLASTIC-CASED DRY CELLS

Arthur F. Daniel, Fair Haven, N. J., assignor to the United States of America as represented by the Secretary of the Army Application August 2, 1950, Serial No. 177,315

1 Claim. (Cl. 136—111)

(Granted under the act of March 3, 1883, as amended April 30, 1928; 370 O. G. 757)

The invention described herein may be manufactured and used by or for the Government for governmental purposes, without the payment of any royalty thereon.

This invention relates to a cell container structure for primary batteries built up from dry cells aligned in series, and particularly from alkaline dry cells of the zinc-mercuric oxide type.

It is an object of this invention to provide a cell container structure which materially simplifies many manufacturing problems and makes possible quick assembling of dry cells into high voltage batteries with the aid of plastic containers. Other objects of this invention will become apparent for those skilled in the art from the following description and accompanying drawing of a cell container structure for primary batteries built up from alkaline dry cells of the zinc-mercuric oxide type.

Figure 2:
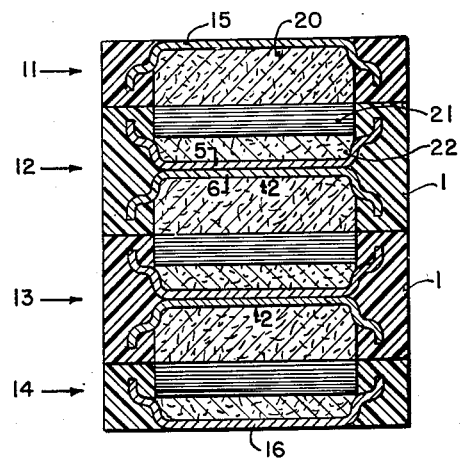
Figure 3:
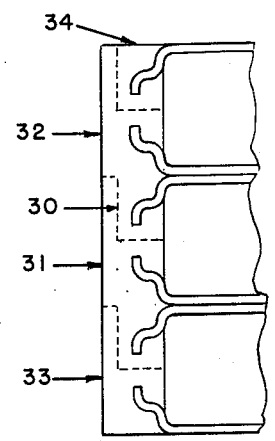

In the drawing:

Figure 1 is a sectional view of one of the units or cartridge sections of the container structure according to my invention. Figure 2 is a sectional view of a battery built up with the aid of such units or cartridge sections as shown in Figure 1, and Figure 3 is a fragmentary sectional view of a battery similar to Figure 2 showing a modified form of cartridge sections.

The cartridge section shown in Figure 1 consists of a cylindrical ring 1 of plastic insulating material such as polystyrene, polyethylene, hard rubber, neoprene, or other insulating high polymers. Inside the cylindrical ring 1 is arranged a partition wall 2 of electrically conductive material, preferably metal, which divides the interior of the cylindrical ring 1 into a housing 3 for the anodic part of one cell and a housing 4 for the cathodic part of the adjacent cell.

The partition wall 2 preferably consists of a bi-metallic sheet, the different metals being chosen so as to prevent undesired reactions between them and the anodic and cathodic parts respectively. If the cell container structure according to this invention is used for alkaline dry cells of the zinc-mercuric oxide type, the metal sheet 5 which faces the anodic part (zinc electrode) of one cell consists preferably of copper, brass, silver, tin or copper-plated steel, while the metal sheet 6, facing the cathodic part (mercuric oxide electrode) of the adjacent cell consists preferably of iron or steel. The two metal sheets 5 and 6 may be fastened together for mechanical and electrical contact by welding or soldering or any other suitable and approved method. After fastening together they are then placed in the plastic mold as inserts. Instead of a bi-metallic plate, it is also possible to use a single amalgamated steel plate.

The partition wall 2 is molded into the plastic ring 1 in well known manner. To prevent leakage or creepage of electrolyte around the peripheral part of the partition wall 2 the peripheral part of said bi-metallic plate is bifurcated and the peripheral parts of each single sheet prolongated so as to elongate the possible leakage and creepage path.

The plastic material from which the cylindrical ring 1 is made must be inert to the action of the electrolyte and any of the components used in the cell; it must also be capable of being made to adhere to the metal of the bi-metallic plate 2.

Figure 2 shows a battery consisting of three cells and built up from two cartridge sections 12 and 13 and two end sections 11 and 14. The two cartridge sections 12 and 13 consist, as the cartridge section in Figure 1, of a cylindrical ring 1, a partition wall 2 comprising a copper disc 5 and a steel disc 6. The end cells 11 and 14 each consist of a half cartridge section, the end cell 11 being closed by a copper plate 15 while the end cell 14 is closed by a steel plate 16. In this way a battery of three cells is built up each of the cells containing a zinc anode 20 consisting of a compressed pellet of amalgamated zinc powder, a layer 21 of porous paper, fiber, felt or other suitable bibulous material capable of retaining sufficient electrolyte, and a cathode comprising an electronically conductive body containing an oxygen yielding compound such as mercuric oxide, silver oxide, lead peroxide or the like containing in known manner conductive materials such as graphite, carbon black or the like. Instead of the zinc pellet 20 and bibulous layer 21 there may be used other well known anode assemblies such as, for instance, a roll of corrugated zinc foil interleaved with a layer of bibulous material.

The structure shown in Figure 2 might, of course, be continued with a greater number of cartridge sections to get any desired voltage. The cartridge sections are fastened or rigidly joined together by several known methods such as heat sealing or with the aid of lacquers or adhesives depending upon the type of plastic used for the manufacture of the cartridge sections.

In order to improve the sealing effect between the individual sections, it is advantageous to increase the surface of the edges of the cartridge sections, as shown in Figure 3 in which the cartridge sections 31 and 32 possess increased surfaces of the edges as indicated by the dotted sealing line 30. The end cartridge sections 33 and 34 must, of course, in this case be adequately formed. Any other type of edges might, of course, be used provided it increases the effective sealing between the cells.

While I have described my invention in connection with a specific cell and a specific structure of such cell, I do not wish to be limited either to the particular design or to the specific combination of internal elements referred to herein since it is evident that similar structures might be used with any other cell system which does not gas during the life of the cell provided proper materials are used.

What I claim is:

In a primary battery built up from alkaline dry cells of the zinc-mercuric oxide type aligned in series, a cell container structure comprising stacked cartridge sections rigidly secured to one another, each of said cartridge sections comprising cylindrical side walls of insulating plastic material and partition walls of electrically conducting material, said partition walls being arranged perpendicularly to said cylindrical side walls and tightly sealed into the cylindrical side walls, said partition walls forming at once the top and the anodic terminal of one cell and the bottom and the cathodic terminal of the adjacent cell, each of said cartridge sections thereby constituting the housing for the anodic part of one cell and the cathodic part of the adjacent cell, characterized in that said partition wall of each cartridge section consists of a bi-metallic plate, the single sheet of said bi-metallic plate facing the cathode consisting of copper the other single sheet facing the anode consisting of steel and that the peripheral part of said bi-metallic plate is spread apart and that the separated peripheral parts of each single sheet are bent and prolongated so as to separate said peripheral parts of each single sheet by a maximum thickness of said insulating plastic material and to elongate the possible leakage and creepage path for the alkaline electrolyte.

ARTHUR F. DANIEL.

REFERENCES CITED

The following references are of record in the file of this patent:

UNITED STATES PATENTS

| Number | Name | Date |
|---|---|---|
| 2,525,270 | Quinnell | Oct. 10, 1950 |
| 2,536,697 | Ruben | Jan. 2, 1951 |

FOREIGN PATENTS

| Number | Country | Date |
|---|---|---|
| 562,780 | Great Britain | July 14, 1944 |
| 565,094 | Great Britain | Oct. 26, 1944 |